3,490,564
TELESCOPIC SHOCK ABSORBER
Arie Adrianus de Koning, Paradijs, and Kornelis Korstiaan Karel de Koning, Kwakseweg 1, Oud-Beijerland, Netherlands
Filed June 16, 1967, Ser. No. 646,564
Claims priority, application Netherlands, June 16, 1966, 6608380
Int. Cl. F16d 57/00; B60t 7/12
U.S. Cl. 188—100             3 Claims

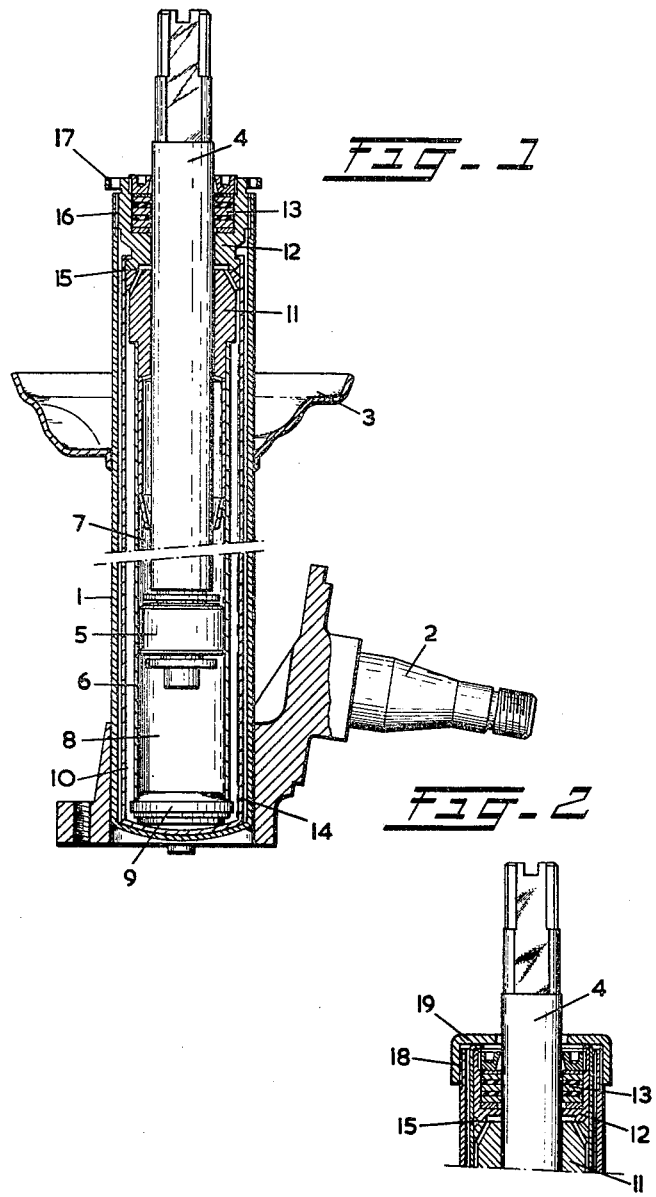

ABSTRACT OF THE DISCLOSURE

A telescopic shock absorber wherein the essential parts are assembled to form a unit housed in a casing which can be bodily removed from the housing of the shock absorber and replaced by a like unit. In motor road vehicles this avoids replacement of the housing usually fitted with, or comprised by, other structures, and enables the manufacturer to pre-assemble and pre-adjust replacement units.

---

This invention relates to a telescopic shock absorber of the kind comprising a housing and an inner structure composed of a number of parts designed for the shock absorbing action, particularly for the wheel suspension system of a vehicle.

In order to achieve that the construction of the wheel suspension system, the wheel spring system and the shock absorber is as compact as possible, it is known, in the case of vehicles, particularly motor road vehicles, for the shock absorber to be constructed with a wheel axle connected thereto for mounting a wheel, while the shock absorber may also be provided with a seat for supporting the vehicle spring or an auxiliary spring for assisting the vehicle spring.

If the wheel supported is steerable, the shock absorber may in addition be provided with a steering arm which is connected to the vehicle steering mechanism. The above-mentioned parts are commonly mounted on the outside of the shock absorber housing.

When the parts of the inner structure are worn, replacement of the entire shock absorber is expensive for the parts connected to the shock absorber are difficult to machine owing to their shape. In practice, therefore, it is only the parts of the inner structure which are replaced and separately mounted in the housing of the shock absorber. Proper mounting of the inner structure, in such a manner that, for example, no parts become jammed in the guideways, requires special tools and skill, while checking a shock absorber as to the proper forces of absorption can only be effected by means of specially built, complicated testing apparatus.

A repair shop does not normally have such tools and apparatus available, so that the replacement cannot be effected in a reliable manner, especially as regards permissible tolerances, prevention of noise, etc.

It is an object of the present invention to provide the possibility of previously assembling and testing replacement units in series. For this purpose the invention provides a shock absorber of the kind described wherein said inner structure comprises a casing by means of which it forms a closed absorber unit, which unit can be bodily removed from the shock absorber housing and replaced by a like unit.

According to another feature of the invention, the cross-sectional configuration of the casing is similar to that of the shock absorber housing.

The invention also relates to the absorber unit per se.

Some embodiments of the invention will be described, by way of example, with reference to the accompanying drawings, in which, FIGS. 1 and 2 each show a longitudinal sectional view of a shock absorber, and a part of a shock absorber respectively, according to the invention, the shock absorber being of the hydraulic type.

Referring to FIG. 1, 1 is the housing of a telescopic shock absorber, right-circular cylindrical in this embodiment, to which are secured a wheel axle or spindle 2 for carrying a vehicle wheel, and a seat 3 for supporting a vehicle spring. A piston rod 4 is on its inner end provided with a piston 5 which divides a cylinder 6, filled with a fluid, into two compartments 7, 8, and comprises suitable passages and suppressing means for allowing fluid to flow, under resistance, from one to the other compartment of the cylinder.

A bottom valve 9 at the end of the cylinder away from the piston rod constitutes a connection between the cylinder compartment 8 and a reservoir 10 located externally of the cylinder 6.

The end of the cylinder 6 located on the side of the piston rod is sealed by a rod guide 11 and a gasket sleeve 12 with gasket 13.

The parts 4, 5, 6, 9, 11, and 12 are surrounded by a casing 14, which also constitutes an outer jacket for the reservoir 10, and there is provided a gasket 15 for sealing purposes.

The above-mentioned parts constitute together with the surrounding casing 14 a closed absorber unit which can be pre-assembled and tested, in series, by the manufacturer, and requires no attention by the repair shop in these respects. The proper operation of the unit is thus ensured at all times.

The unit can be easily mounted in the housing 1 by screwing the gasket sleeve 12 on to the inner threading 16 of the housing 1 through the mounting holes 17.

FIG. 2 shows a construction in which the housing 1 has an external screwthread 18. The assembly is then completed by the application of a screwcap 19. The other parts are designated by the same reference numerals as in FIG. 1.

The method in which the absorber unit is mounted depends on the construction of the housing 1.

The embodiments described relate to a shock absorber employing liquid as the absorbing fluid and comprising a reservoir for receiving the volume of liquid displaced during the absorbing stroke of the piston.

The casing 14 then constitutes an outer wall of the reservoir. The construction according to the invention can also be used if the fluid used is partly liquid and partly gas, as well as for absorbers operating entirely pneumatically. In the last-mentioned cases, there may be no reservoir externally of the cylinder at all, so that the shock absorber housing is originally at the same time the cylinder. When the inner structure is replaced the casing 14 will be going to act as the cylinder, as a result of which the piston area will become somewhat smaller. However, this drawback can be offset by adjusting the absorbing forces somewhat higher.

We claim:
1. In an independent suspension device for a wheel of an automative vehicle and the spindle and support on which the wheel is mounted, said suspension device comprising an upright tubular housing having an opening at its upper end and closed at its lower end and secured to the wheel spindle support, a hydraulic tubular shock absorber unit supported in said housing and bodily mounted to and removable through said upper end of said housing, said unit being closed at its upper end of a gasket sleeve, piston rod and cylinder means, the rod extending upwardly through and guided in said gasket sleeve and having its upper end extremity disposed for connection with a vehicle body part, a reservoir sleeve surrounding the cylinder within the housing and suspended from the gasket sleeve and having a closed bottom, there also being included a valve means at the lower end of the cylinder opening out of said cylinder into the reservoir sleeve about said cylinder.

2. A device as defined in claim 1 wherein the cylinder also carries a guide for the piston rod.

3. A device as defined in calim 1 wherein the reservoir sleeve closed bottom is engaged with the closed lower end of the tubular housing.

References Cited
UNITED STATES PATENTS

| | | | |
|---|---|---|---|
| 1,529,235 | 3/1925 | Bechereau. | |
| 3,001,610 | 9/1961 | Takagi | 188—88 |
| 3,379,286 | 4/1968 | Takagi | 188—88 |
| 2,409,349 | 10/1946 | Focht. | |
| 2,790,659 | 4/1957 | Malone et al. | |
| 2,888,106 | 5/1959 | Peras. | |

DUANE A. REGER, Primary Examiner

U.S. Cl. X.R.
188—129